US010126807B2

(12) United States Patent
Nathan et al.

(10) Patent No.: US 10,126,807 B2
(45) Date of Patent: Nov. 13, 2018

(54) DYNAMIC SWITCHING OF POWER MODES FOR TOUCH SCREENS USING FORCE TOUCH

(71) Applicant: Cambridge Touch Technologies LTD., Cambridge (GB)

(72) Inventors: Arokia Nathan, Cambridge (GB); Jackson Chi-Sun Lai, Toronto (CA); Suk-Bae Cha, Tokyo (JP); Corbin Church, Westmount (CA)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 14/624,281

(22) Filed: Feb. 17, 2015

(65) Prior Publication Data

US 2015/0234446 A1 Aug. 20, 2015

Related U.S. Application Data

(60) Provisional application No. 61/941,195, filed on Feb. 18, 2014.

(51) Int. Cl.

*G06F 1/32* (2006.01)
*G06F 3/044* (2006.01)
*G06F 3/041* (2006.01)

(52) U.S. Cl.

CPC ............ *G06F 1/3262* (2013.01); *G06F 3/044* (2013.01); *G06F 3/0414* (2013.01); *G06F 3/0416* (2013.01); *G06F 2203/04105* (2013.01)

(58) Field of Classification Search

CPC .... G06F 1/3262; G06F 1/3231; G06F 3/0412; G06F 3/0414; G06F 3/0416; G06F 3/044; G06F 2203/04105

(Continued)

(56) References Cited

U.S. PATENT DOCUMENTS 4,516,112 A 5/1985 Chen
4,899,710 A 2/1990 Takahashi et al.

(Continued)

FOREIGN PATENT DOCUMENTS

AU 2015101688 A4 12/2015
CN 102449583 A 5/2012

(Continued)

OTHER PUBLICATIONS

PCT Search Report and Written Opinion in WO counterpart application PCT/US2015/016205, published May 21, 2015.

(Continued)

*Primary Examiner* — Amare Mengistu
*Assistant Examiner* — Jennifer Zubajlo

(57) ABSTRACT

Switching of power modes for touch screens is disclosed. In example embodiments a touch detect mode may be activated for touchscreen operation. The touchscreen may be a projected capacitance screen that includes force sensing based on piezo electric sensors. The touch detect mode may be a low power mode in which at least one channel, but fewer than all channels of the touch screen are monitored. When is determined that a touch event has occurred a switch to a scan mode for touchscreen operation may be performed. Scan mode may be a higher power mode in which all channels of the touch screen are scanned at least for position sensing. The touch detect mode monitoring may be implemented by monitoring the total charge on the at least one channel and providing a voltage signal. When the voltage signal meets predetermined criteria an indication of a touch event may be generated.

14 Claims, 6 Drawing Sheets

(58) Field of Classification Search
USPC .......................................................... 345/174
See application file for complete search history.

(56) References Cited

U.S. PATENT DOCUMENTS 5,942,733 A 8/1999 Allen
7,042,288 B2 5/2006 Matsui et al.
8,982,081 B2 3/2015 Li et al.
8,988,384 B2 3/2015 Krah et al.
9,448,655 B2 9/2016 Dumitru et al.
9,690,408 B1 * 6/2017 Krah .................... G06F 3/0412
2004/0155991 A1 8/2004 Lowles et al.
2005/0024344 A1 2/2005 Trachte
2006/0138983 A1 6/2006 Lee
2007/0040814 A1 2/2007 Lee
2007/0119698 A1 5/2007 Day
2007/0163815 A1 7/2007 Ungaretti
2007/0262964 A1 11/2007 Zotov
2008/0018608 A1 1/2008 Serban et al.
2008/0048995 A1 2/2008 Abileah
2008/0174852 A1 7/2008 Hirai et al.
2008/0277171 A1 * 11/2008 Wright ................. G06F 1/3203 178/18.06
2009/0027353 A1 1/2009 Im et al.
2009/0061823 A1 3/2009 Se
2009/0065267 A1 3/2009 Sato
2009/0066663 A1 3/2009 Chang
2009/0066665 A1 3/2009 Lee
2009/0167713 A1 7/2009 Edwards
2009/0254869 A1 10/2009 Ludwig et al.
2009/0309616 A1 * 12/2009 Klinghult ................ G06F 3/044 324/686
2010/0013800 A1 1/2010 Elias
2010/0066692 A1 * 3/2010 Noguchi ............... G06F 3/0412 345/173
2010/0079384 A1 4/2010 Grivna
2010/0109595 A1 5/2010 Tan et al.
2010/0110026 A1 5/2010 Kis
2010/0128002 A1 5/2010 Stacy et al.
2010/0144391 A1 6/2010 Chang
2010/0149110 A1 6/2010 Gray
2010/0253638 A1 * 10/2010 Yousefpor ............ G06F 3/0416 345/173
2010/0309164 A1 12/2010 Yeh et al.
2011/0001492 A1 1/2011 Nys
2011/0050618 A1 3/2011 Murphy et al.
2011/0096025 A1 4/2011 Slobodin
2011/0157068 A1 * 6/2011 Parker .................. G06F 1/3203 345/174
2011/0175844 A1 7/2011 Berggren
2011/0261007 A1 10/2011 Joharapurkar
2011/0291994 A1 12/2011 Kwak
2012/0013572 A1 1/2012 Pak et al.
2012/0050213 A1 * 3/2012 Bokma ................. G06F 3/0416 345/174
2012/0050216 A1 3/2012 Kremin et al.
2012/0057803 A1 3/2012 Wakazono
2012/0062508 A1 3/2012 Liu et al.
2012/0105367 A1 5/2012 Son
2012/0121142 A1 5/2012 Nageesh
2012/0154326 A1 6/2012 Hung-Tai
2012/0182225 A1 7/2012 Brosnan
2012/0242610 A1 9/2012 Yatsumatsu
2012/0262416 A1 * 10/2012 Kitamura ............. G06F 1/3262 345/174
2012/0293551 A1 11/2012 Momeyer
2012/0299866 A1 11/2012 Tien-Wen Pao et al.
2012/0299868 A1 11/2012 Bhagavat
2013/0009905 A1 1/2013 Castillo
2013/0021285 A1 1/2013 Kimura
2013/0050126 A1 2/2013 Kimura et al.
2013/0050130 A1 2/2013 Brown
2013/0076646 A1 3/2013 Krah
2013/0076647 A1 * 3/2013 Yousefpor ............ G06F 3/0412 345/173
2013/0082970 A1 * 4/2013 Frey ...................... G06F 3/0414 345/173
2013/0176265 A1 * 7/2013 Zurek .................. G06F 1/3262 345/174
2013/0176275 A1 7/2013 Weaver et al.
2013/0194198 A1 8/2013 Guard
2013/0215049 A1 8/2013 Lee
2013/0229382 A1 * 9/2013 Huang ................... G06F 3/044 345/174
2013/0234986 A1 * 9/2013 Elias .................. G06F 3/03545 345/174
2013/0234987 A1 9/2013 Ye
2013/0257744 A1 10/2013 Daghigh et al.
2013/0257759 A1 10/2013 Daghigh
2013/0257769 A1 10/2013 Sheik-Nainar
2013/0257783 A1 10/2013 Chenchi et al.
2013/0265239 A1 10/2013 Parekh
2013/0265256 A1 10/2013 Nathan
2013/0265276 A1 * 10/2013 Obeidat ................. G06F 3/044 345/174
2013/0307823 A1 * 11/2013 Grivna ................. G06F 3/0416 345/174
2014/0002114 A1 1/2014 Schwartz et al.
2014/0008203 A1 * 1/2014 Nathan ................ H03K 17/962 200/600
2014/0028606 A1 1/2014 Gianetta
2014/0043287 A1 2/2014 Nakijima
2014/0043289 A1 2/2014 Stern
2014/0139444 A1 5/2014 Kauhanen et al.
2014/0204059 A1 7/2014 Geaghan
2014/0210781 A1 * 7/2014 Stern .................... G06F 1/3262 345/174
2014/0285456 A1 9/2014 Zhang
2014/0292699 A1 10/2014 Ando
2014/0368260 A1 12/2014 Tanada
2015/0035768 A1 2/2015 Shahparnia et al.
2015/0109217 A1 4/2015 Zhu et al.
2015/0234519 A1 8/2015 Gowreesunker et al.
2015/0253935 A1 9/2015 Toda
2015/0302554 A1 10/2015 Costa et al.
2015/0355771 A1 12/2015 Watazu et al.
2016/0026299 A1 1/2016 Kitada et al.
2016/0117034 A1 * 4/2016 Day ...................... G06F 3/0414 345/174
2016/0162011 A1 7/2016 Verma et al.
2016/0162101 A1 7/2016 Pant et al.
2016/0162102 A1 7/2016 Shaparnia et al.
2016/0195994 A1 7/2016 Kitada et al.
2016/0291729 A1 10/2016 Schardt et al.
2016/0299625 A1 10/2016 Kano

FOREIGN PATENT DOCUMENTS

CN 103218091 A 7/2013
CN 103518181 A 1/2014
EP 2290510 A1 3/2011
EP 2693316 A1 2/2014
EP 2871554 A1 5/2015
EP 2884373 A1 6/2015
EP 2899615 A1 7/2015
JP 2009-122969 A 6/2009
JP 2011-523111 A 8/2011
WO 2007146785 A1 12/2007
WO 2009150498 A1 12/2009
WO 2011055809 A1 5/2011
WO 2012031564 A1 3/2012
WO 2012034715 A1 3/2012
WO WO 2013/043336 A1 3/2013
WO 2013149024 A1 10/2013
WO 2014092758 A1 6/2014
WO 2014094283 A1 6/2014
WO WO 2014/098946 A1 6/2014
WO WO 2014/129083 A1 8/2014
WO WO 2014/192786 A1 12/2014
WO 2015046289 A1 4/2015
WO WO 2015/098725 A1 7/2015

(56) References Cited

FOREIGN PATENT DOCUMENTS

OTHER PUBLICATIONS

Extended European Search Report in counterpart EPO application EP20150751362, dated Sep. 29, 2017.
Chenchi Luo et al: "Compressive Sensing for Sparse Touch Detection on Capacitive Touch Screens", IEEE Journal on Emerging and Selected Topics in Circuits and Systems, IEEE, Piscataway, NJ, USA,vol. 2, No. 3, Sep. 1, 2012 (Sep. 1, 2012 ), pp. 639-648.
First Office Action in Japanese Patent Application No. 2016-553477, dated Aug. 22, 2018, including concise explanation of relevance in English.
First Office Action in Chinese Patent Application 201580009358.3, dated Sep. 5, 2018, including concise explanation of relevance in English.

* cited by examiner

DYNAMIC SWITCHING OF POWER MODES FOR TOUCH SCREENS USING FORCE TOUCH

CROSS REFERENCES TO RELATED APPLICATIONS

The present application claims priority to and the benefit of U.S. Provisional Patent Application No. 61/941,195 filed Feb. 18, 2014, the entire contents of which are hereby incorporated by reference.

TECHNICAL FIELD

The described embodiments relate to modes of operation for touchscreens and, in particular, to switching of power modes for touch screens using touch detect.

BACKGROUND

Devices having touch functionality have become widely used in everyday life. Devices that may utilize touch functionality include devices such as smartphones, tablet computers, electronic kiosks, gaming devices, personal computers and any other type of electronic device that can be configured to receive input through an interface that includes touch functionality.

A dominant touch technology is projected capacitance technology. Projected capacitance technology provides high clarity and low reflectance for a display, and strong durability when used with devices having touch functionality. However, projected capacitance technology results in higher device power consumption as compared to the use of other touch technologies. This may have a significant impact on device performance, especially in battery powered portable devices. It would be desirable, therefore to provide technologies and techniques that allow lower power consumption in devices including touch technologies such as projected capacitance technology.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Example embodiments of a system and method for switching power modes for touchscreen operation are disclosed. In the embodiments a touch detect mode using low power may be utilized for touchscreen operation to reduce power consumption during time when it is not necessary to use a higher power consumption scan mode of operation. In one example embodiment, activation of the touch detect mode may be based on selected criteria or selected conditions which allow for power saving operation being satisfied or occurring. Activation of the touch detect mode may include switching from a scan mode to the touch detect mode based on the selected criteria being satisfied or the occurrence of the selected conditions. Monitoring of at least one channel of a touch screen may be performed while in the touch detect mode and a determination that a touch event has occurred may be made based on the monitoring of the at least one channel. When it is determined that a touch event has occurred a transition from the touch detect mode may be performed. In alternative embodiments the transition from the touch detect mode made be performed based on other criteria being satisfied.

The transition from the touch detect mode may include switching from the touch detect mode to the scan mode. In an example embodiment the scan mode may comprise a high power mode in which all channels of the touch screen are scanned and the touch detect mode may comprise a low power mode in which fewer channels of the touch screen are monitored for a touch event. In alternatives of this embodiment the channels monitored may comprise all channels of the touch screen. The monitoring of the at least one channel of the touch screen while in touch detect mode may include monitoring the amount of charge on the at least one channel and generating a signal based on the charge. The signal then may be used in determining if a touch event has occurred. The signal then may be used in determining if a touch event has occurred. Example circuitry to implement the monitoring may include a switch and a touch detection circuit having a charge amplifier circuit. The charge amplifier circuit may generate a voltage signal based on the summed charges on the at least one channel that are simultaneously coupled to the touch detect circuitry in touch detect mode.

In another example embodiment the system and method may be implemented in combination with a projected capacitance touchscreen having a hybrid projected capacitance including a force sensing system based on piezoelectric or piezo resistive sensors for determining the force of a touch input. The force sensing system used with this embodiment allows capacitance on at least one touch sensor channel of the touchscreen to be monitored for indications of a touch event while in a low power touch detect mode.

In the example embodiments, the selected criteria or the occurrence of selected conditions that may activate the touch detect mode may include, for example, a device being in idle touch mode, such as a device playing media for a predetermined time period in which no input is received, a device being in sleep mode, or any other mode of operation for a touchscreen in which only intermittent touch input may be received but in which it may be desirable to detect an input to activate the device.

DETAILED DESCRIPTION

Figure 1:
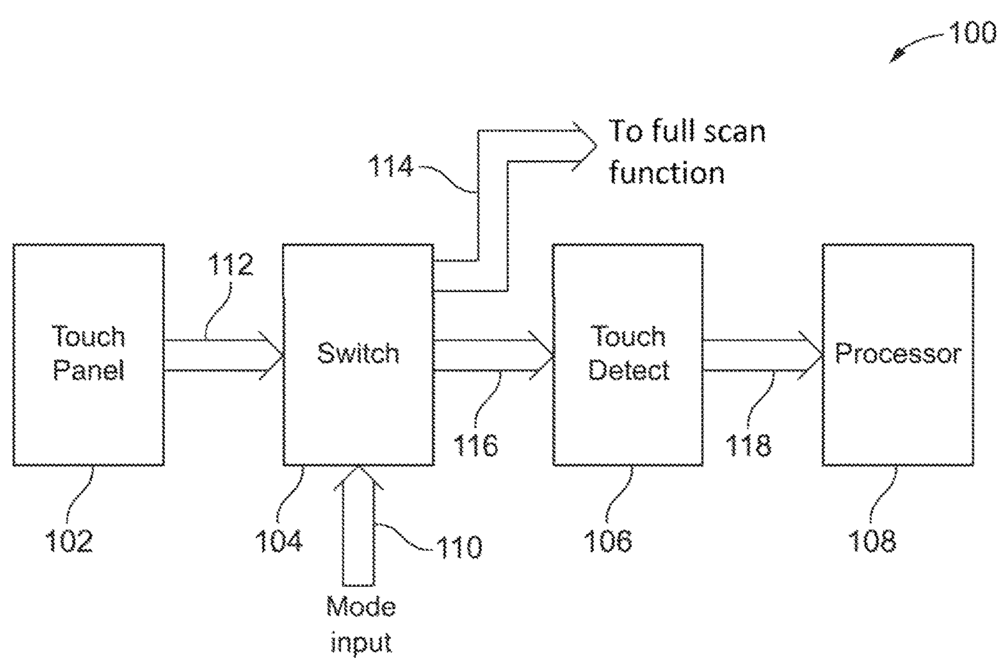
FIG. 1 is a block diagram of an example system according to embodiments of the disclosure.

The system, method and apparatus will now be described by use of exemplary embodiments. The exemplary embodiments are presented in this disclosure for illustrative purposes, and not intended to be restrictive or limiting on the scope of the disclosure or the claims presented herein. The technologies and techniques that are described herein provide low power touch detection that may be utilized to provide power savings for touchscreen devices. The example embodiments provide advantages, for example, when implemented with projected capacitance touch panels that are implemented to include force sensing features based on piezoelectric or piezo resistive sensors that also may determine the force of a touch input. In these touch panels a low power state in which no driving signal or a very low power driving signal is required for determining touch may be utilized. In this low power state, force or touch pressure on the touch panel results in the capacitance of the sensors changing and charge being generated on the sensor channels. In an example implementation of the disclosure, this charge may be monitored while in the low power state and the projected capacitance touch panel sensors may effectively function as a passive sensor for a touch event while in this low power state. Device power consumption is therefore reduced.

The example embodiments of the disclosure provided an advantage over conventional touch systems that cannot make a distinction of whether or not a finger press or other touch event is being made on a touchscreen lens without scanning. When the display is on in a device using such a touch system, the touch system is scanning the touch screen at its highest performance level waiting to detect a finger press/touch event or, effectively, to determine if nothing has been received. This scanning is done largely because the accuracy at a low power mode will be too low to trigger a finger press/incident touch event tracking state. In touch systems of this type scanning at the high performance level is used because otherwise an end user may notice a lag when the display is on and a finger press is applied by tapping or flicking at a relatively high frequency. The touch detection of the embodiments reduces the need to use the scanning mode and reduces power consumption.

Touch detection according to the embodiments of the disclosure provides advantages in that these embodiments may be used in combination or in conjunction with various higher power scanning techniques. The touch detection may be used to initiate transitions to any other scanning techniques such as those that provide location/position determination or scanning techniques that provide location/position determination including force sense capability. For example, touch detection may be used in conjunction with full scanning techniques that include full reporting with full voltage (display on for normal operation and high accuracy), full scanning techniques that include reduced reporting with reduced voltage (display backlight off, display IC at standby/touch in low power mode and low/mid touch accuracy), and, reduced scanning techniques that include reduced reporting and reduced voltage (deep sleep mode). The touch detection of the embodiments may be configured to operate in combination with these techniques to reduce the reliance on, and reduce the use of, these scanning techniques to provide less power consumption.

The example embodiments of touch detection according to the disclosure also provide advantages over touch controller ICs that allow for ‘gesture mode’. These touch controller ICs allow a touch panel to be operated at low power and still detect a few gesture possibilities. However, the number of gestures these touch controller ICs can detect in gesture mode is limited, resolution is limited, and the region in which gestures may be detected is usually limited. For example, in some current smartphones, the touch panel is only looking at the lower part of sensing network, for example, a V-shaped section near the center of the bottom of the touch screen, using, for example, ⅓ the resolution and low accuracy/frequency for scanning, as it waits for a finger to make a swipe gesture to wake up the screen. Example embodiments of the touch detection according to the embodiments of the disclosure may be configured to provide more touchscreen coverage with less power consumption than these gesture modes.

An advantage of the touch detection of the embodiments is that the touch detection is able to sense whether, for example, a finger is on a touchscreen without scanning. Depending on the configuration setup for monitoring the sensor channels of a touchscreen, touch detection may also be configured in example embodiments to be capable of tracking the location of an incident event on the touch screen by varying the switching of the sensor channels to the monitoring circuitry. In these embodiments, this location detection capability of touch detection may also be combined with reduced accuracy scanning thus allowing the power consumption of the projected capacitance side to be reduced while still providing some coarse location detection. In some current uses, to save power, projected capacitance scanning may be slowed down, including, for example, in some situations when display is on. This reduces the touch accuracy of the scanning but may be combined with touch detection to provide increased touch accuracy based on both of the scanning and touch detect operating together to confirm position. With full scanning of the projected capacitance but using reduced reporting and reduced voltage, only low or middle level reduced accuracy is provided. The force touch can also sense the location when in reduced scanning mode and it can track a touch with at least the same low or middle level accuracy as projected capacitance until such time as the projected capacitance wakes up for full scanning. Then full scanning using reduced reporting and reduced voltage may then be initiated. Alternatively, any other mode of scanning may be initiated.

One example implementation may be configured to not wake up the projected capacitance immediately when a touch event is detected, and instead let the force touch detection track the finger for a time by utilizing varied switching of the monitored sensor channels to the monitoring circuitry for a time, and then wake up the projected capacitance. By utilizing various switching schemes on known sensor channels, various location/position determination implementations may be realized by using the disclosed touch detection. This may save additional power by keeping the projected capacitance off long enough, but not too long for the user to notice any potential issues with lag or accuracy. Touch detection of the embodiments provides the advantage of knowing when a finger, or whatever object, that touches a touch screen is present or not without having to do the same full scanning as is done using projected capacitance.

Touch detection according to the embodiments also may remove the need to use a mechanical button to bring a device out of sleep mode and power up touch screen position sensors when a touch screen has been powered down. The embodiments allow the convenience of pressing on the screen directly or applying a wakeup gesture to bring a device out of sleep mode. The embodiments also allow a device to be switched to a low power mode when the device is in an “idle” touch mode, for example when a device user is viewing a movie.

Referring now to FIG. 1, therein is a block diagram of an example system 100 according to embodiments of the disclosure. In FIG. 1, system 100 is shown as including touch panel 102, switch 104, touch detect function 106 and processor 108. The system and method for switching power modes for touchscreen operation is implemented in the exemplary functions illustrated by switch 104, touch detect function 106 and processor 108. FIG. 1 illustrates the interconnections between the functional blocks of one embodiment of the disclosure. Switch 104 is coupled to sensor channels of touch panel 102 through channel connections 112 and coupled to touch detect function 106 through touch detect input 116. Switch 104 receives a mode input signal 110 that indicates whether the switch is to be in touch detect mode configuration or full scan mode configuration. When the mode input signal indicates full scan mode, switch 104 outputs the channel connections 112 of the sensor channels of touch panel 102 for utilization by a full scan function over full scan connections 114. When mode input signal 110 indicates touch detect mode, switch 104 outputs a signal over touch detect input 116 that is indicative of the charge on the channel connection 112 of at least one sensor channel of touch panel 102 to touch detect function 106. Touch detect function 106 receives the signal on touch detect input 116 and determines if a touch detect event has occurred. If a touch detect event has occurred touch detect function 106 outputs a signal on touch detect output 118 to processor 108 indicating that a touch detect event has occurred. Processor 108 interacts with the other functions of system 100 as appropriate. Processor 108 includes one or more memory or memories having code or software programs which when executed cause processor 108 to interact and control operation of the system in the touch detect and full scan modes. For example, in one implementation, processor 108 may generate the mode input signal 110 for switch 104 based on touch detect output signal 118 to indicate to switch 104 what mode to operate in. Processor 108 may also control the interaction of system 100 with the full scan function and other functions of a device in implementing touch detection of the example embodiments.

Processor 108, which, while shown as one functional block, the functions of processor 108 may be implemented by, and may comprise, one or more processors or processing units, and use of the term processor is meant to cover all such implementations.

In an example implementation switch 104 may be configured to sum the charge on one or more of the sensor channel connections as touch detect input 116. In touch detect mode the number of sensor channels of touch panel 102 from which the charge is summed and output by switch 104 as touch detect input 116 to touch detect function 106 may differ from the number of channels used for full scan. For example, the number of sensor channels from which the charge is generated at touch detect input 116 may be of a number less than the number of sensor channels that are switched and output by switch 104 over full scan connections 114. Also, there may be other sensor channels input to the full scan function from touch panel 102 that are not fed through switch 104.

In alternative implementations, processor 108 may also be used to control switch 106, while in touch detect mode, to connect each of a plurality of sensor channels of touch screen 102 to the monitor output in a sequence that allows position determination as well as detection of a touch on the touchscreen. By monitoring and processing the sequenced touch detect signals processor 108 may switch between selected vertical and horizontal sensor channels of touch screen 102 to detect a touch event from multiple channels, for example intersecting channels, and determining the position of the touch event from the monitored data.

Figure 2A:
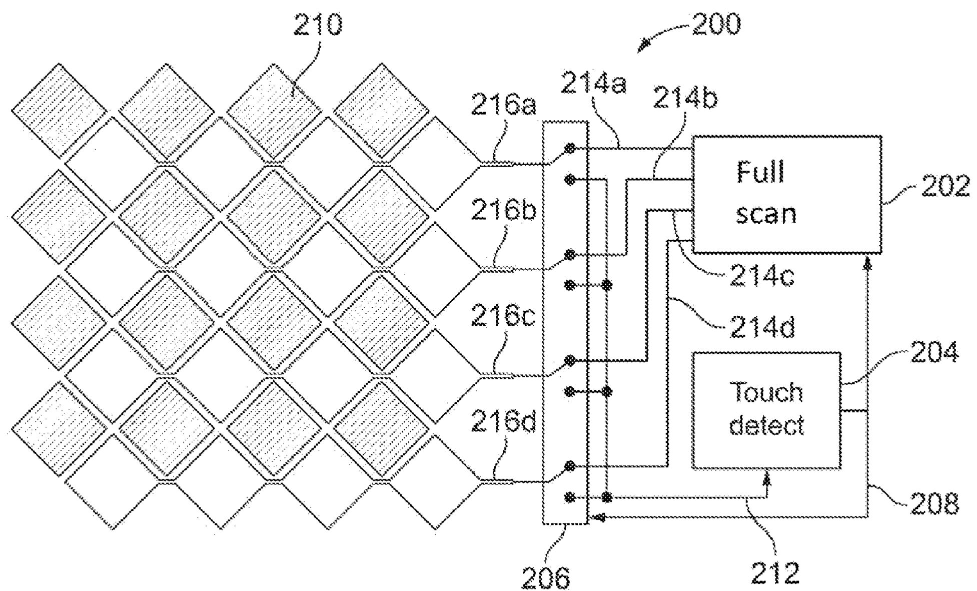
FIG. 2A is a simplified diagram of example circuitry configured for a scan mode.
Figure 2B:
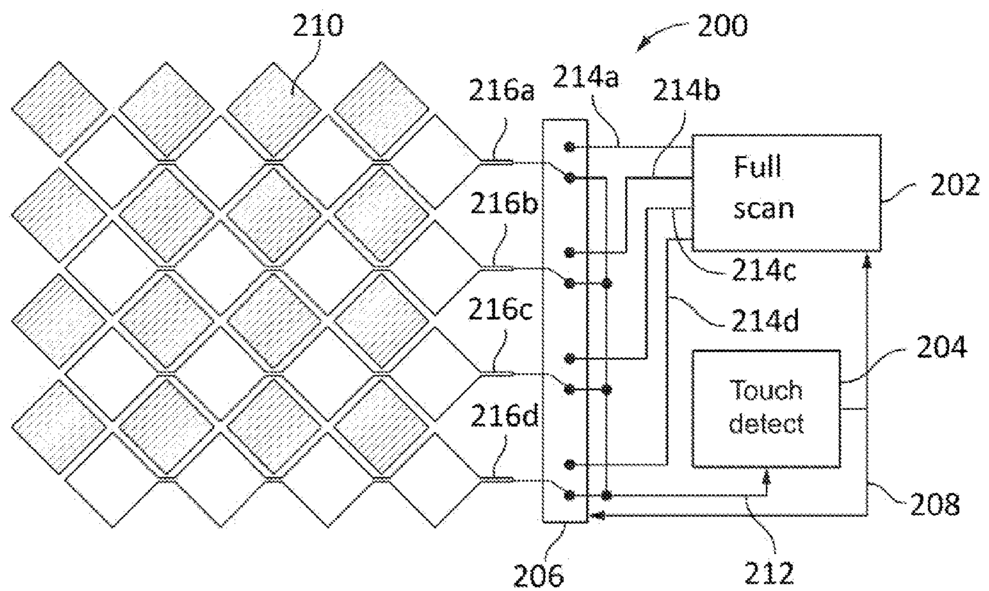
FIG. 2B is a simplified diagram of example circuitry configured for a touch detect mode.

Referring now to FIGS. 2A and 2B therein are illustrated simplified diagrams of example circuitry configured for a scan mode and a touch detect mode, respectively. Circuitry 200 includes switch 206, touch detect function 204, full scan function 202 and touch panel 210. Switch 206 and touch detect function 204 provide the circuitry that implements the switching of power modes for touch panel 210. The example circuitry may be implemented in the embodiment shown in FIG. 1 with switch 104 implemented as switch 206, touch panel 102 implemented as touch screen 210 and touch detect function 106 implemented as touch detect function 208. The example of FIGS. 2A and 2B illustrates a portion of touch panel 210 including sensor channels 216*a*-216*d*. Although FIGS. 2A and 2B show four sensor channels oriented in the horizontal direction, touch panel 210 may include any number of sensor channels that are oriented in either the vertical or horizontal directions that are connected to switch 206 for monitoring in touch detect mode, depending on the actual touch panel with which the embodiments are implemented. Switch 206 functions to switch and transition the sensor channels 216*a*-216*d* between the full scan function 202 and touch detect function 204. Switch 206, includes switches that are connected between each of the sensor channels 216*a*-216*d* and a full scan connection 214*a*-214*d*, respectively, when in scan mode, and between each of the sensor channels 216*a*-216*d* and touch detect connection 212 when in touch detect mode. The number of sensor channels that are utilized by switch 206 may vary with the implementation.

In one example implementation all sensor channels of touch panel 210 would be connected to full scan function 202 while in the full scan mode and a number n of sensor channels, wherein n may be any number up to the number of all sensor channels, would be switchable to touch detect function 204 for touch detect operation. Circuitry 200 of FIGS. 2A and 2B may be coupled to processing circuitry, such as for example processor 108 of FIG. 1, that provides control for the timing and switching of signals between switch 206, touch detect function 204, full scan function 202 and touch panel 210. The processing circuitry may be included in touch detect function 204 or some or all of the functions may be included in a separate processor that functions in conjunction with touch detect function 208 in processing touch detect signals.

FIG. 2A illustrates the circuitry with switch 206 in full scan mode. Full scan mode may be entered, for example, when a device on which touch panel 210 is implemented is in the active mode and receiving user input at touch panel 210. Switches of switch 206 connect each of sensor channels 216*a*-216*d* to one of the full scan connections 214*a*-214 *d*, respectively. Full scan function 202 may then operate to utilize connections 214*a*-214*d* of touch screen 210 for full resolution and speed capacitive scan sensing that could include, for example, touch position sensing and/or touch force sensing, FIG. 2B illustrates the circuitry with switch 206 in touch detect mode. Touch detect mode may be activated, for example, when a device on which touch panel 210 is implemented transitions to a sleep mode when no user input is being or has been received (for a predetermined amount of time) at touch panel 210. Switches of switch 206 connect each sensor channel 216*a*-216*d* to touch detect connection 212. Touch detection function 204 may then operate to utilize connection 212 for touch detection. Touch detection function 204 may monitor connection 212 by sensing the total charge generated on the connected sensor channels 216*a*-216*d* at connection to 212. When a signal that is generated based on the charge meets a predetermined criteria, touch detect function 204 may determine that a touch event has occurred and generate a touch detect signal on connection 208. A processor, such as processor 108 of FIG. 1 may utilize the touch detect signal to indicate to full scan function 202 that a touch has been detected and to indicate that switch 206 may be switched to full scan mode.

Figure 3A:
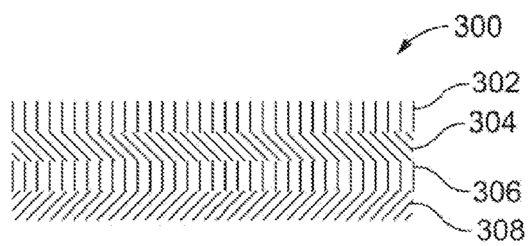
FIG. 3A is a simplified cross-sectional view of an example touch screen that may be used with embodiments of the disclosure.

Referring now to FIG. 3A, therein is shown a simplified cross-sectional view of an example touch screen that may be used with embodiments of the disclosure. Touch screen 300 may be a piezoelectric or piezo resistive based touch screen. Touch screen 300 may comprise pattern conductive layer 302, a piezoelectric layer 304 forming pressure sensing elements, for example, a PVDF layer, patterned conductive layer 306 and display glass 308. Piezo electric layer 304 is embedded within the touch sensors formed by conductive layers 302 and 304. The piezo electric layer 304 within the touch sensor allows a force gesture such as a "tap" on the touch screen 300 to be detected using, for example, a low power comparator circuit while in a touch detect mode. This allows a passive detection for touch detection without scan excitation signals. For utilization in the example implementations of the disclosure, operation in touch detect mode may allow a low power state for operation of touch screen 300 in which no driving signal or, alternatively, only a low frequency driving signal is used for touch detection by the touch detect function. Also, as in the embodiment of FIGS. 2A and 2B, a lesser number than all of the available sensor channels may be monitored in the touch detect mode.

FIG. 3A shows a simplified stack-up of a touch panel 300 including the piezoelectric layer 304 and features that may be similar to the stack-up of a projected capacitive touch panel. The conductive layers 302 and 306 may be both patterned out of a transparent conductive material such as ITO, Cu mesh, or Ag Nanowires, or just one of the conductive layers may be patterned and the other un-patterned to create the X-Y location sensing and a Z pressure sensing network. In one embodiment, the piezoelectric layer 304 can be a film that the electrodes formed by conducting layers 302 and 306 are deposited directly onto. In another embodiment, piezoelectric layer 104 may be a thin film that is laminated onto a thicker supporting substrate like PET, and the combination of the two can be represented as piezoelectric layer 304. It yet another embodiment, the piezoelectric layer 304 can be printed by slot die coating or screen printing and coated onto a supporting substrate like PET, to form piezoelectric layer 304. The combination of the electrodes 302 and 306 form the sensing network that can sense pressure and location of the touch. In use with the embodiments of the disclosure the sensors may be connected by a switch, for example, to channel sensors 216*a*-216*d* of FIG. 2. The stack-up combination 300 can be used in external and embedded configurations such as on-cell and in-cell constructions, and the stack-up may be varied as needed.

Figure 3B:
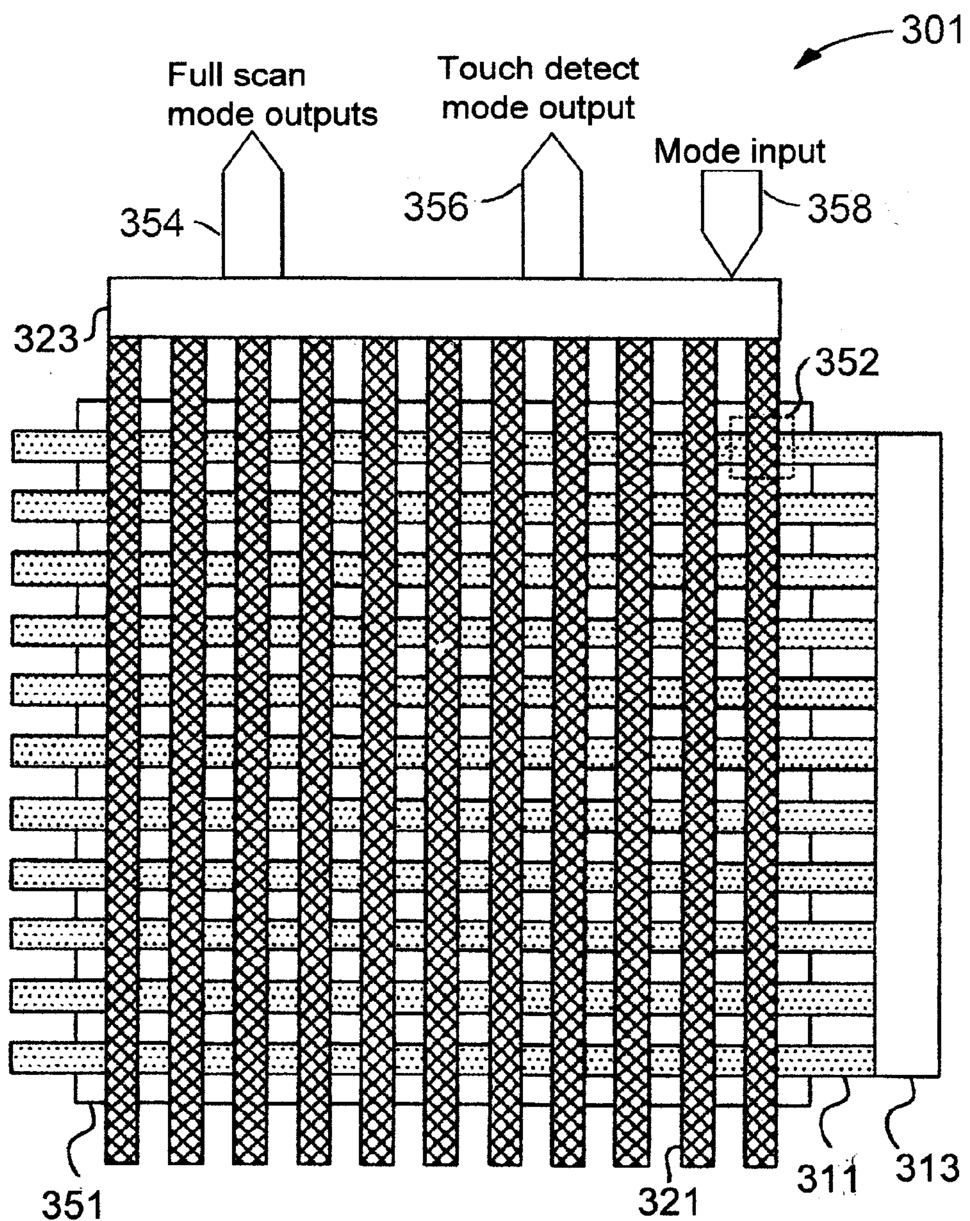
FIG. 3B is a plan view of an example display assembly.

Referring now to FIG. 3B, there is illustrated a plan view of an example display assembly with touch panel traces shown that is usable in an embodiment of the invention. Display assembly 301 is a projected capacitive touch screen, and includes a plurality of transmitter traces 311 (shown as horizontal traces) and a plurality of receiver traces 321 (shown as vertical traces) forming a touch sensing grid. Traces 311 and 321 are electrically conductive and substantially optically transparent in order to be overlaid on a display pixel array 351. A cross section of display assembly 301 showing the traces 311 and 321 at the intersections on the grid may be represented by conducting layers 302 and 306, respectively, of FIG. 3A with at least a portion of piezoelectric layer 304 between them. The traces may be formed, for example, by depositing ITO or Ag nanowire on a glass substrate. Moreover, transmitter traces 311 are electrically insulated from receiver traces 321, for example with an intermediate insulating barrier formed of glass or some other dielectric.

In full scan operation, a driver circuit 313 applies a voltage to the transmitter traces 311 to create an electrostatic field. In the absence of an external stimulus (e.g., finger or stylus), the electrostatic field is uniform across the grid. Each intersection of a transmitter and receiver trace forms a capacitor, which has a corresponding capacitance. The receiver traces 321 form sensor channels that may be coupled to a switch 323. In full scan mode switch 323 connect the sensor channels to a position detect and/or pressure sensing full scan function at full scan mode outputs 356. When in touch mode, driver circuit 313 may apply no voltage to the transmitter traces and switch 323 may connect at least one of the sensor channels to a touch detect function at touch detect function mode output 358. Switch 323 may be implemented, for example, as switch 206 or 408 shown in FIG. 2 or 4, respectively, to couple assembly 301 to a touch detect function and full scan function according to the mode input signal 354. In alternative embodiments, the switch 323 may be connected to any of the receiver and/or transmitter traces 321 or 311 (X or Y axis) when in touch detect mode to create monitored sensor channels.

When a conductive object contacts the panel, the uniform electrostatic field becomes locally distorted. This distortion causes a change in capacitance (e.g., reduction in mutual capacitance) at an intersection of the transmitter and receiver traces. This change in capacitance can be determined by monitoring the charge each of the receiver traces 321 that are connected to the touch detection function while in touch detect mode. A touch event on the screen may be detected, depending on the number of channels monitored, when the monitored channels are affected by a touch. Typically, there are between 10 to 16 transmitter traces 311, and 10 to 16 receiver traces 321, resulting in between 100 to 256 distinct touch locations. Traces are typically between 4 to 6 mm in width, to capture a typical finger touch. Display pixel array 351 has a pixel array portion 352 consisting of a subset of the pixel array 351.

The pixel array and pixel array portions of display assemblies for touch screens that may be utilized in combination with embodiments of the disclosure may be implemented in any manner that allows application of the touch detection mode. Example implementations of display assemblies that may be suitable for use with the embodiments are shown and described in United States Patent Application Publications 2013/0265256 and 2014/0008203, each of which is hereby incorporated in its entirety.

In the embodiments of the disclosure at least one of the pressure sensing elements of an array is coupled to a touch detection function through a sensor channel. In touch detection mode the charge on capacitances of the coupled pressure sensing element sensor channels is monitored by a touch detection function as described herein. The monitoring may be performed with no or driving voltage applied to the array.

Figure 4:
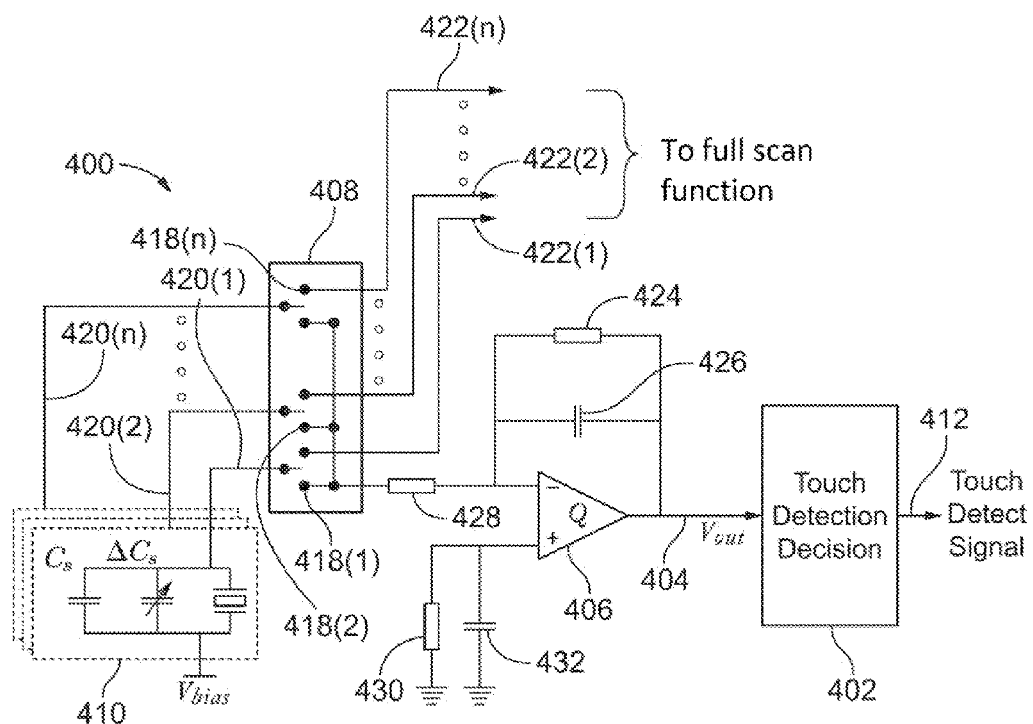
FIG. 4 is schematic of an example touch detection circuit.

Referring now to FIG. 4, therein is a schematic of another example touch detection circuit according to an embodiment of the disclosure. FIG. 4 shows circuitry 400 that may be implemented with a piezoelectric layer 304 to perform the touch detect function. Circuitry 400 includes switch 408, charge amplifier 406 and touch detection decision function 402. Switch 408 is coupled to projected capacitive touch screen 410 which may be implemented according to the implementation shown in FIG. 3. The example circuitry 400 may be implemented in the embodiment shown in the block diagram of FIG. 1 with switch 408 implemented as switch 104, touch panel 410 implemented as touch screen 102, and charge amplifier 406 and touch detection decision function 402 implemented as touch detect function 106. Resistors 424, 428 and 430, and capacitances 426 and 432, are used to configure amplifier 406 as a low power charge amplifier. Voltage Vout on output 404 of amplifier 406 is generated in proportionally to the charge input at the minus (−) input of amplifier 406 through resistor 428. Circuitry 400 includes switch 408, charge amplifier 406 and touch detection decision function 402.

When circuitry 400 is in full scan mode switch 408 is utilized to configure switches 418(1)-418(*n*) to connect sensor channels 420(1)-420(*n*) to full scan function connections 422(1)-422(*n*), respectively. Connections 422(1)-422 (*n*) may then be utilized for full scan functioning with touch screen 410. The number of channels utilized for touch detect mode may be any number n out of the total number of sensor channels of touch screen 410. In the example of FIG. 4, touch screen 410 may have more than n sensor channels and all of the sensors channels may not be shown.

When touch detect mode is activated and circuitry 400 is in touch detect mode, switch 408 is utilized to configure switches 418(1)-418(*n*) to each of the connect sensor channels 420(1)-420(*n*) to the minus (−) input of amplifier 406 through resistor 428 at the same time. Amplifier 406 functions as a charge amplifier that tracks or monitors charge on sensor channels 420(1)-420(*n*) and that generates Voltage Vout on output 404. Vout may be proportional to the charge on sensor channels 420(1)-420(*n*). Touch detection decision function 402 receives the Vout signal 404 and determines whether a touch event has taken place based on monitoring Vout and Vout meeting predetermined criteria. When touch detection decision function 402 determines that a touch event has occurred a touch detect signal is generated. The touch detect signal may be used to cause a transition from the touch detect mode. In alternative implementations for other consideration, such as device use context may be used in conjunction with the touch detect signal to determine that a touch event has taken place and cause a transition from the touch detect mode. In the transition from touch detect mode circuitry 400 may switch to operation in the scan mode.

In alternative embodiments it may be possible for touch detect circuitry to move to or from modes of operation other than a full scan mode when transitioning from or to, respectively, touch detect mode. A processor, such as processor 108 of FIG. 1, may be used to control switch 408, while in touch mode, to connect at least one sensor channel to amplifier 406 as touch detect mode is activated and connect the sensor channels to the full scan function as transitions out of touch detect mode take place in response to touch events occurring.

In alternative embodiments, the processor may connect each of a plurality of sensor channels of touch screen 102 to the monitor output in a sequence that allows position determination along with touch detection of a touch on the touchscreen by monitoring and processing the sequenced touch detect signals. This may be done for example, by controlling switch 408 to switch between selected vertical and horizontal sensor channels of touch screen 410 to detect a touch event from multiple channels, for example intersecting channels, and determine the position of the touch event from the monitored data.

Figure 5:
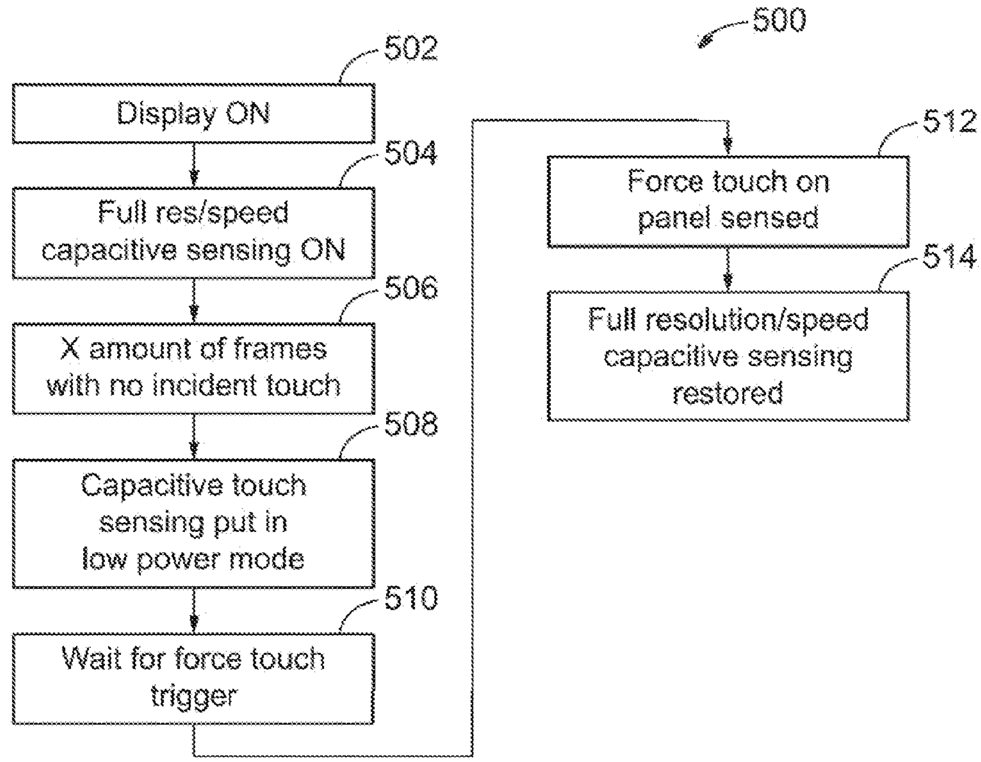
FIG. 5 is a flow diagram that illustrates example operations that may be performed according to an embodiment of the disclosure.

Referring now to FIG. 5, therein is a flow diagram that illustrates example operations that may be performed according to an embodiment of the disclosure. FIG. 5 may be described with reference to the functional blocks of FIG. 1.

The process begins at 502 at display on. This may occur, for example, when a user powers up a device on which touch panel 102 is implemented. At 504 full resolution/full speed capacitive sensing is switched on. As part of the operation at 504 the mode input signal 110 may be input from processor 108 to switch 104 and control switch 104 to switch to scan mode. Channel connection inputs 112 from touch panel 102 are then connected to scan connections 114 through switch 104. Processor 108 may also generate other control signal to control the device at 504 such as, for example, signals to indicate to a full scan function to activate. The scan connections 114 then may be utilized by the full scan function for full resolution full speed capacitive sensing for receiving user input.

At 506 it is determined that x amount of frames with no incident touch detected on touch panel 102 have occurred. This could occur, for example, if no user input is received within a predetermined time period that is defined by the period for x amount of frames received from touch panel 502 by the full scan function. In one example implementation of FIG. 5, processor 108 may interact with the full scan function to receive information and make this determination at 506.

Next, at 508, in response to the detection of x amount of frames with no incident touch at 506, the capacitive touch sensing is put in low power mode. In the operation of 508 touch detect mode is activated for the system of FIG. 1 to provide low power operation. In an implementation, processor 108 may generate mode input signal 110 to control switch 104 to activate touch detect mode. In touch detect mode, channel connection inputs 112 are connected to touch detect input 116. At 510 touch detect function 106 monitors touch detect input 116 and waits for a touch event. At 510 the display may remain in an active viewing mode such as, for example, a mode for viewing videos. In example implementations, the touch detect function 106 may perform the monitoring as was described for the example circuits of FIGS. 2A and 2B, and FIG. 4.

Next, at 512, touch detect function senses a force touch on touch panel 102 and determines that a touch event has taken place. For example, a user of a device on which touch panel 102 is implemented may touch panel 102 to activate and wake the device from low power touch detect mode and begin entering input. In example implementations, the touch detect function 106 may perform the determination as was described for the example circuits of FIGS. 2A and 2B, and FIG. 4. The touch detect function may be configured by the user to sense a force touch or detect a touch event when the force of the touch on touch screen 102 is determined by touch detect function 106 to be above a predetermined threshold.

At 514, in response to sensing a force touch, full resolution/l full speed capacitive sensing is restored and a transition from touch detect mode is performed as the full scan mode is activated. As part of the operation at 514 the mode input signal 110 may be input from processor 108 to switch 104 and control the switch 104 to switch to scan mode. Channel connection inputs 112 from touch panel 102 are then connected to scan connections 114 through switch 104. Processor 108 may also generate other control signal to control the device at 504 such as, for example, signals to indicate to a full scan function that it should activate. The scan connections 114 then may be utilized by the full scan function for full resolution full speed capacitive sensing for receiving user input. The touch panel power mode switching functions may then continue to switch between the touch detect mode and the full scan mode according to the embodiment of FIG. 5 as the device is operated.

Figure 6:
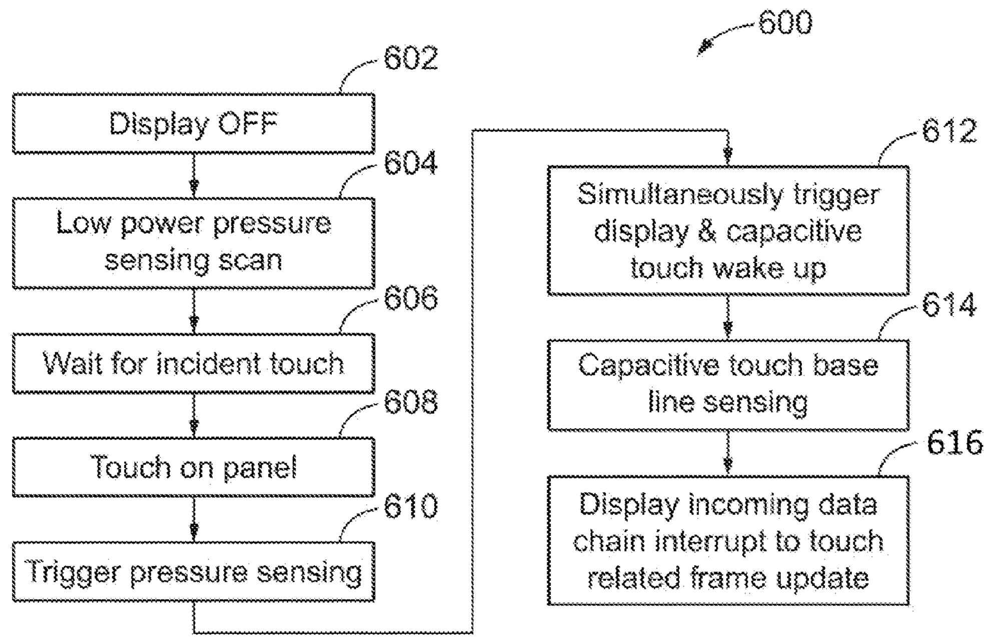
FIG. 6 is a flow diagram that illustrates example operations that may be performed according to another embodiment of the disclosure; and, FIG. 7 is a diagram illustrating an example timeline for mode transitions according to an embodiment of the disclosure.

Referring now to FIG. 6, therein is a flow diagram that illustrates example operations that may be performed according to another embodiment of the disclosure. FIG. 6 may be described with reference to the functional blocks of FIG. 1.

The process begins at 602 at display off. This may occur, for example, when a user switches a device on which touch panel 102 is implemented to a sleep mode or when a device automatically switches to a sleep mode after receiving no input or not being used for a predetermined amount of time. At 604 low power pressure sensing monitoring is activated. In the operation of 604 touch detect mode is activated, for example, for the system of FIG. 1 to provide low power operation with no driving signals or voltages being applied to the touch screen. In an implementation, processor 108 may generate mode input signal 110 to control switch 104 to activate touch detect mode. In touch detect mode, channel connection inputs 112 are connected to touch detect input 116. At 606 touch detect function 106 monitors touch detect input 116 and waits for an incident touch event. In example implementations, the touch detect function 106 may perform the monitoring as was described for the example circuits of FIGS. 2A and 2B, and FIG. 4.

At 608, touch detect function senses a force touch on touch panel 102 and determines that a touch event has taken place and at 610 touch pressure sensing is triggered For example, a user of a device on which touch panel 102 is implemented may touch panel 102 with the display off to activate and wake the device from low power touch detect mode and begin entering input. In example implementations, the touch detect function 106 may perform the determination as was described for the example circuits of FIGS. 2A and 2B, and FIG. 4. For example, the touch detect function may be configured by the user to sense a force touch or detect a touch event when the force of the touch on touch screen 102 is determined by touch detect function 106 to be above a predetermined threshold.

Next at 612 the display is turned on and capacitive touch wake up is performed by activating full scan mode. As part of the operation at 612, the mode input signal 110 may be input from processor 108 to switch 104 and control switch 104 to switch to scan mode. Channel connection inputs 112 from touch panel 102 are then connected to scan connections 114 through switch 104. Processor 108 may also generate other control signal to control the device at 612 such as, for example, signals to indicate to a full scan function to activate. At 614, as the display and touch functions wake up, a baseline state is determined from the capacitive sense lines while there is a finger or object touching the screen. This baseline state may be used in subsequent events to confirm when a touch event is actually occurring by comparing to the baseline state. The scan connections 114 then may be utilized by the full scan function through capacitive touch base line sensing for full resolution and full speed capacitive sensing for receiving user input. At 616 the display data input (i.e. what is written on the display) is interrupted once touch related data has been received and, in response to what the user inputted, indicates to the display to display the appropriate data. For example, the display displays the home screen of a smartphone over some time period and then stops upon command of the touch data, which tells the display to write the data displaying an app interface that the user has indicated they want to open through touch input.

Figure 7:
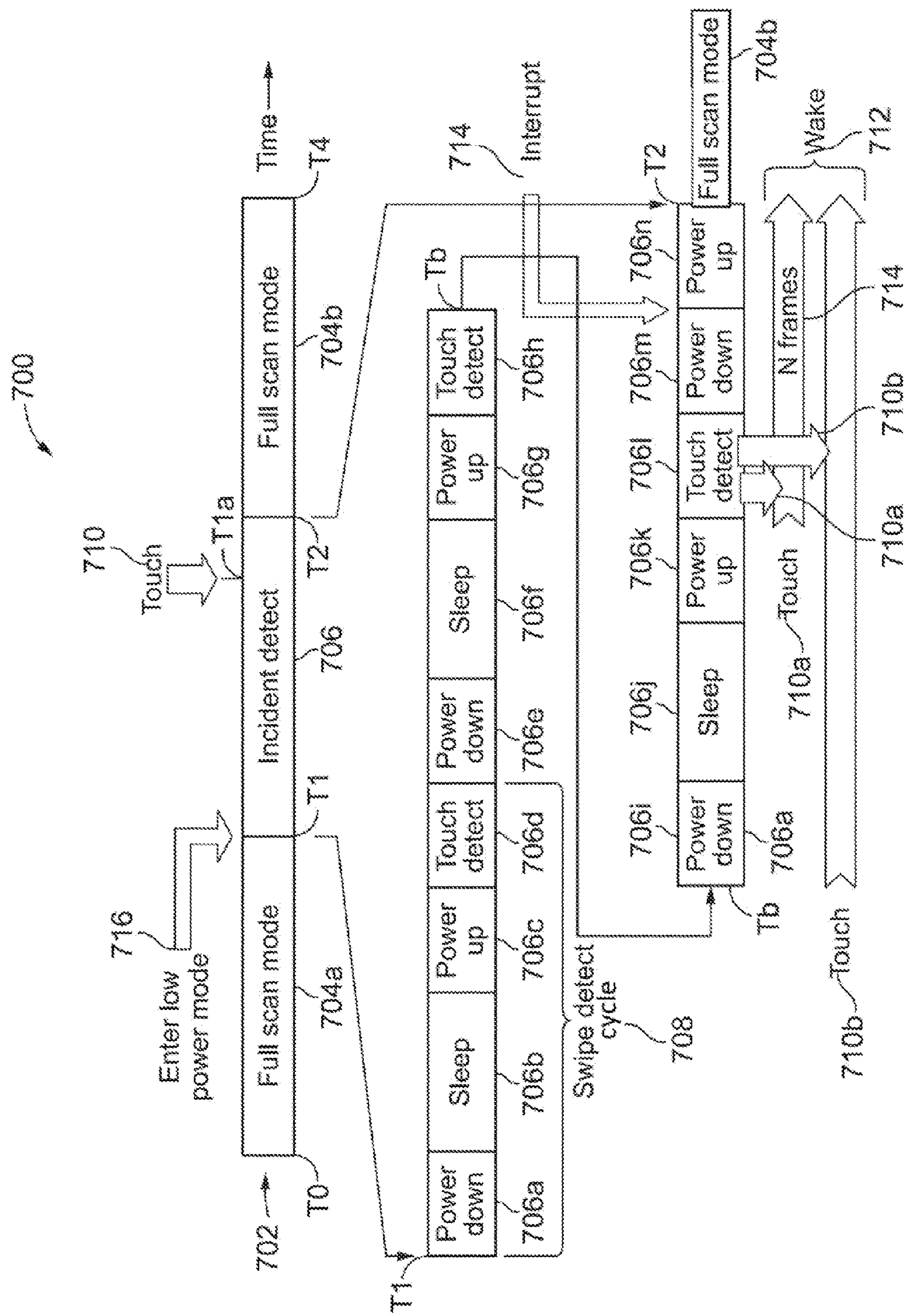

Referring now to FIG. 7, therein is a diagram illustrating an example timeline 702 for mode transitions that may be implemented in alternative embodiments of the disclosure. FIG. 7 illustrates examples of how touch scanning frequency may be reduced by using sleep periods interspersed with transitions to or from touch detect mode operation. FIG. 7 illustrates example operations that may occur after incident detect mode 706 is activated at time T1, when operation of the embodiment switches from full scan mode 704*a* to incident detect mode 706, and prior to time T2, when operation switches back to full scan mode 704*a*.

At time T0 full scan mode 704*a* is active. At time T1 low power mode is activated 716 and incident detect mode 706 is activated. Operation in incident detect mode 706 includes swipe detect cycles such as swipe detect cycle 708 that includes periods of power down 706*a*, sleep 706*b*, power up 706*c* and touch detect 706*d*. In incident detect mode 706 swipe cycles are repeated at periods shown by 706*a*-706*d*, 706*e*-706*h* and 706*i*-706*l*.

FIG. 7 shows an example touch 710 occurring at time T1*a* of incident detect mode 706. Two example scenarios for how touch 710 may be detected are illustrated by example touch 710*a* and touch 710*b* which are shown being detected at touch detect period 706*l*. This illustrates that an incident touch 710*b* may happen during the cycle up/down time 706*i* to 706*l* and will be detected at 706*l* when the touch detect mode is active again. Touch 710*a* happens during 706*l* and will be detected during 706*i*. From detection at 706*l* it then takes N frames to power back up to full scan mode 704*b* from touch detect 706*l*.

The example embodiments disclosed herein have been described in the general context of circuitry and processors having processor-executable code or instructions stored on memory that may comprise one or more computer readable storage media (e.g., tangible non-transitory computer-readable storage media such as memory or memories). As should be readily understood, the terms "computer-readable storage media" or "non-transitory computer-readable media" include the media for storage of data and program instructions, and do not include propagated or modulated data communication signals.

While the functionally disclosed herein has been described by illustrative example using descriptions of the various components and devices of embodiments by referring to functional blocks and processors or processing units, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc.

Also, although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the disclosed processes, these elements, and operations may be replaced by any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method of switching power modes for a projected capacitive touchscreen which comprises a plurality of panel traces including plurality of transmitter traces and a plurality of receiver traces forming a touch sensing grid, wherein at least a portion of a piezoelectric layer is between the transmitter and receiver traces and forms a plurality of piezoelectric sensors in the touch sensing grid, the method comprising:

activating a scan mode for high power operation of the touchscreen and configuring a switch by coupling each of the plurality of receiver traces of to a corresponding scan output of a plurality of scan outputs of the switch, wherein in the scan mode a driver circuit applies a voltage to each of the plurality of transmitter traces and a first signal generated from a first one or more sensors of the plurality of piezo electric sensors of the touchscreen on a first one of the plurality of receiver traces is output on a corresponding first one of the plurality of scan outputs;

activating a touch detect mode for low power operation of the touch screen and configuring the switch for the touch detect mode by coupling at least one of the plurality of panel traces to a monitor output of the switch, wherein in the touch detect mode the driver circuit applies no voltage to any of the plurality of panel traces;

monitoring the monitor output for a second signal generated by a second one or more sensor elements of the plurality of piezoelectric sensors using touch detection circuitry while in touch detect mode;

generating a third signal at a touch detect output of the touch detection circuitry when the second signal generated at the monitor output of the switch meets a predetermined criteria; and, transitioning from the touch detect mode in response to the generation of the third signal at the touch detect output.

2. The method of claim 1, wherein the transitioning comprises switching from the touch detect mode to the scan mode in response to the generation of the third signal at the touch detect output.

3. The method of claim 1, wherein the scan mode comprises a high power mode in which all channels of the plurality of receiver traces of the touch screen are scanned and the touch detect mode comprises a low power mode in which all or less than all of the plurality of panel traces of the touch screen are monitored.

4. The method of claim 1, wherein the first one or more sensors and the second one or more sensors comprise the same one or more sensors.

5. The method of claim 1, wherein the monitoring of the monitor output while in touch detect mode comprises monitoring the amount of charge on the at least one of the plurality of panel traces.

6. An apparatus for switching power modes of a projected capacitive touchscreen which comprises a plurality of panel traces including a plurality of transmitter traces and a plurality of receiver traces forming a touch sensing grid, wherein at least a portion of a piezoelectric layer is between the transmitter and receiver traces and forms a plurality of piezoelectric sensors in the touch sensing grid, the apparatus comprising:

a switch having a plurality of channel inputs, a plurality of scan outputs and a monitor output, wherein each of the plurality of channel inputs is coupled to one of the plurality of panel traces;

touch detection circuitry coupled to the monitor output and having a touch, detect output;

a processor coupled to the switch and the touch detection circuitry; and memory coupled to the processor, the memory including code executable to cause the processor to control the apparatus to:

activate a scan mode for high power operation of the touchscreen and configure the switch for the scan mode by coupling each of the plurality of channel inputs that is coupled to a receiver trace to a corresponding scan output of the plurality of scan outputs, wherein in the scan mode a driver circuit is controlled to apply a voltage to each of the plurality of transmitter traces and a first signal generated from a first one or more sensors of the plurality of piezo electric sensors of the touchscreen on a first one of the plurality of receiver traces is output on a corresponding first one of the plurality of scan outputs;

activate a touch detect mode for low power operation of the touch screen and configure the switch for the touch detect mode by coupling at least one of the plurality of channel inputs to the monitor output of the switch, wherein in the touch detect mode the driver circuit is controlled to apply no voltage to any of the plurality of panel traces;

monitor the monitor output for a second signal generated by a second one or more sensors of the plurality of piezoelectric sensor sensors while in touch detect mode;

generate a third signal at a touch detect output when the second signal generated at the monitor output of the switch meets a predetermined criteria; and, transition from the touch detect mode in response to the generation of the third signal at the touch detect output.

7. The apparatus of claim 6, wherein the code is further executable to cause the processor to control the apparatus to transition from the touch detect mode by switching from the touch detect mode to the scan mode in response to the generation of the signal at the touch detect output.

8. The apparatus of claim 6, wherein the first one or more sensors and the second one or more sensors compose the same one or more sensors.

9. The apparatus of claim 6, wherein the scan mode comprises a high power mode in which all receiver traces of the touch screen are scanned and the touch detect mode comprises a low power mode in which all or less than all the panel traces of the touch screen are monitored.

10. The apparatus of claim 6, wherein the code is executable to cause the processor to control the apparatus to monitor the monitor output by monitoring the amount of charge on the at least one of the plurality panel traces.

11. An apparatus for switching a touchscreen between power modes, wherein the touch screen comprises a plurality of transmitter channels and a plurality of receiver channels forming a touch sensing grid, wherein each of the plurality of receiver channels is coupled to one of a plurality of channel outputs providing channel signals, and at least a portion of a piezoelectric layer is between the transmitter and receiver channels forming the plurality of piezoelectric sensor elements in the touch sensing grid, the apparatus comprising:

a switch configurable for a scan mode and a touch detect mode, the switch having a plurality of channel inputs, a plurality of scan outputs, and a monitor output, wherein each channel output of the touchscreen is coupled to one of the plurality of channel inputs of the switch and the switch is configured to receive a channel signal generated from at least one piezoelectric sensor element of a plurality of piezoelectric sensor elements of the touchscreen on at least one of the plurality of channel inputs, wherein the switch is configurable to couple each of the plurality of channel inputs to a corresponding scan output of the plurality of scan outputs when the apparatus is in the scan mode, and to couple at least one of the plurality of channel inputs to the monitor output when the apparatus is in the touch detect mode;

a driver circuit that provides a voltage to the touchscreen while the apparatus is in scan mode in order that the channel signal from the at least one piezoelectric sensor element is generated at the least one piezoelectric element using the voltage, and provides no voltage to the touchscreen while the apparatus is in touch detect mode in order that the channel signal from the at least one piezoelectric sensor element is generated at the at least one piezoelectric sensor element passively; and, touch detection circuitry coupled to the at least one monitor output, the touch detect circuitry having a touch detect signal output and configured to monitor the monitor output when the apparatus is in the touch detect mode and generate a touch detect signal when the signal generated at the monitor output of the switch meets a predetermined criteria.

12. The apparatus of claim 11, wherein the touch detection circuitry comprises conversion circuitry configured to convert a charge on the monitor output to a voltage level and the touch detection circuitry generates the touch detect signal when the voltage level meets a predetermined criteria.

13. The apparatus of claim 12, wherein the touch detection circuitry further comprises processing circuitry coupled to the conversion circuitry, and the processing circuitry monitors the voltage level and generates the touch detect signal when the voltage level meets a predetermined criteria.

14. The apparatus of claim 11, further comprising: a processing unit configured to control the switch while in touch detect mode to connect each of the at least one of the plurality of channels inputs to the monitor output in a sequence that allows position determination of a touch on the touchscreen.

* * * * *